(12) United States Patent
Ensenat De Carlos et al.

(10) Patent No.: US 7,712,480 B2
(45) Date of Patent: May 11, 2010

(54) METHOD OF EXTRACTING CONTENTS FROM SEALED FLEXIBLE CONTAINERS USING IRRIGATION WATER, DEVICE FOR IMPLEMENTING SAME AND ASSOCIATED CONTAINER

(75) Inventors: Luz Ensenat De Carlos, E-Madrid (ES); Albert Infantes Mulà, Barcelona (ES); Ismael Castella Clerch, Barcelona (ES)

(73) Assignee: Melcart Projects, S.L., Badalona (ES)

( * ) Notice: Subject to any disclaimer, the term of this patent is extended or adjusted under 35 U.S.C. 154(b) by 284 days.

(21) Appl. No.: 11/912,410

(22) PCT Filed: Apr. 25, 2006

(86) PCT No.: PCT/ES2006/000203

§ 371 (c)(1),
(2), (4) Date: Oct. 24, 2007

(87) PCT Pub. No.: WO2006/114464

PCT Pub. Date: Nov. 2, 2006

(65) Prior Publication Data

US 2008/0155893 A1 Jul. 3, 2008

(30) Foreign Application Priority Data

Apr. 26, 2005 (ES) ............................... 200501014

(51) Int. Cl.
*B65D 83/06* (2006.01)
(52) U.S. Cl. ............................. 137/1; 137/268; 239/310
(58) Field of Classification Search ................. 137/268, 137/1; 422/261, 282, 281; 239/310
See application file for complete search history.

(56) References Cited

U.S. PATENT DOCUMENTS

| 3,083,916 A | 4/1963 | Neel |
| 3,166,096 A | 1/1965 | Lang |
| 4,081,006 A | 3/1978 | Crowell et al. |

(Continued)

FOREIGN PATENT DOCUMENTS

ES 286797 11/1985

(Continued)

*Primary Examiner*—Kevin L Lee
(74) *Attorney, Agent, or Firm*—Michael J. Striker

(57) ABSTRACT

The invention relates to a method of extracting contents from sealed flexible containers using irrigation water, to a device for implementing same and to the container used. The inventive method essentially comprises the following steps: a) perforation of the container (1) with the closure of a container support (10); b) injection of irrigation water into the container (1) through the perforations thus produced; c) breakage of the container, by applying same against breaking means comprising projecting elements (16) that are disposed on the container support (10), such that the container (1) is subjected to the pressure of the irrigation water; and d) extraction of the soluble fertiliser (3) contained in the container (1) by means of the stream of irrigation water. The invention also relates to the device used to perform said method, comprising a container support (10) which is divided into a body (12) and a lid (13), perforation means in the form of points (15), water injection means, breaking means consisting of projections (16) which are disposed inside the container support (10) and means for opening and closing the container support (10). The container (1) used comprises a receptacle (2) which is closed with a cover (4) having a peripheral rim (7).

15 Claims, 5 Drawing Sheets

U.S. PATENT DOCUMENTS

| | | |
|---|---|---|
| 4,212,373 A | 7/1980 | Scragg |
| 4,333,493 A | 6/1982 | Beiswenger et al. |
| 4,729,399 A | 3/1988 | Wetzel et al. |
| 4,823,829 A | 4/1989 | Woods |
| 4,842,729 A | 6/1989 | Buchan |
| 4,901,890 A | 2/1990 | Mivelaz |
| 4,907,618 A | 3/1990 | Ho |
| 4,971,091 A * | 11/1990 | Ho .............................. 137/268 |
| 5,259,409 A * | 11/1993 | Cervola ...................... 137/268 |
| 6,164,326 A | 12/2000 | Zhadanov |
| 2002/0092926 A1 | 7/2002 | Thornton |
| 2003/0071058 A1 | 4/2003 | Studer et al. |
| 2004/0232163 A1 | 11/2004 | Reinsch et al. |

FOREIGN PATENT DOCUMENTS

| GB | 2 159 244 | 11/1985 |
|---|---|---|

\* cited by examiner

METHOD OF EXTRACTING CONTENTS FROM SEALED FLEXIBLE CONTAINERS USING IRRIGATION WATER, DEVICE FOR IMPLEMENTING SAME AND ASSOCIATED CONTAINER

CROSS-REFERENCE TO RELATED APPLICATION

The invention described and claimed hereinbelow is also described in Spanish Patent Application P 200501014 filed on Apr. 28, 2005. This Spanish Patent Application, whose subject matter is incorporated here by reference, provides the basis for a claim of priority of invention under 35 U.S.C. 119(a)-(d).

BACKGROUND OF THE INVENTION

The present invention relates to a method of extracting contents from sealed containers containing at least one substance using irrigation water, and for any irrigation system, for fertilising any type of decorative plant, grass or crop. The fertilising substance can be powder, crystalline, microgranulated, granulated or compacted in an appropriate manner in one or several pieces. The invention further relates to the device for implementing the method and to the sealed containers that will contain the fertilising substance.

US patent application 2004/0232163 describes a device which allows precisely controlling the weight of a powder fertiliser incorporated in a liquid flow by means of using a gravimetric sensor. This device is complex and expensive and is not suitable for a small-scale non-professional user.

In addition the use of pre-metered and pre-packaged portions of fertiliser for fertilising any type of crops and gardens using irrigation water has the advantage of aiding in maintenance and fertilising operations, saving manual labor and problems with the application of organic material (traditionally used method), which causes bad odors and the growth of weeds, while at the same time assuring fertiliser quality consistency.

Patent document U.S. Pat. No. 4,333,493 considers as a problem the excessive complexity of the devices incorporating the fertiliser into the stream of irrigation water in a precise manner, and based on the idea that this precision in the formulation is unnecessary for most applications, it proposes the use of a frustoconical disposable cartridge containing the fertiliser in granular form. The base of the cartridge has a calibrated orifice for inflowing water and a plurality of peripheral outflow orifices. Both the inflow orifice and the outflow orifices remain covered until the cartridge is used by means of a self-adhesive film which must be manually removed.

Patent document U.S. Pat. No. 4,901,890 considers the problem of the early fertiliser release by the previously mentioned devices in automatic irrigation systems. The proposed solution consists of the use of a closed cartridge by means of a membrane that is perforated by a hollow needle driven by the irrigation water when pressure is introduced in the circuit. The sealed cartridge thus does not allow its content to come out until irrigation is performed. Once the membrane is perforated, the irrigation water is injected therein through the center of the needle, peripherally extracting the fertilising solution.

Patent document U.S. Pat. No. 4,907,618 describes the previous device, performing the injection of the irrigation water into the disposable cartridge through the outside of the perforating needle, whereas the fertilising solution is extracted through its inside through a conduit connected to a suction area in the water outflow.

Finally, patent document U.S. Pat. No. 6,164,326 considers the problem of opening small gel capsules like those used for personal hygiene. The proposed solution is based on the manual compression of these capsules against fixed opening means arranged inside a container. These opening means are formed by cutting or sharp projections.

SUMMARY OF THE INVENTION

The object of the present invention is to provide a method and a device which allow extracting a soluble fertiliser from a sealed container without needing to previously open same, assuring the complete extraction of the fertiliser as a result of the extensive breaking of the container and effective circulation of water therethrough.

In the method of the invention, said sealed container is positioned and tightened, during the closing, in an extraction device formed by a closed chamber, or container support, having means intended to perforate and break the faces of the container according to a predefined layout. Water from the main irrigation pipe is introduced in the device, causing the container to break and the fertiliser to be entrained, then the draining of the liquid (water+fertiliser) after the extraction, which liquid will be incorporated into the irrigation system. The method does not need any particular requirements regarding the flow of water into the main irrigation pipe, nor does it require any type of additional power source since the container is broken and the fertiliser is dissolved due to the pressure created inside the container and the mechanical action of the passage of the irrigation water.

The system aids in the complete solubility of the fertiliser due to the pressure created inside the container support, which prevents filters and/or irrigation systems from becoming blocked. The use of these sealed containers also prevents direct contact with the chemical substances forming the fertiliser, conferring greater safety to their application, which is often done by non-specialized personnel.

In a variant of the invention, the water inlet member has means intended for perforating the upper face of the container, and water injection means for injecting water therein, such that when the extraction face (usually the lower face) of the container is progressively and locally pulled on against breaking means formed by projecting elements of the container support, comprising embossed and/or hollowed elements, said extraction face breaks at multiple points according to a layout predefined by the position of said embossed and/or hollowed elements when reaching its breaking stress, allowing the liquid to drain out after the extraction, in which the container support and the water inlet member cooperate with one another to assure tightness by pressing the edge of the container and forming therebetween a cavity assuring a defined shape of the container.

The method will be better understood with the description of its successive steps, which can be carried out with the simple adaptation of the device object of the invention to the main irrigation pipe:

In a first time, the container is positioned in the container support, the lower face in this position then being the extraction face.

In a second time, the container support provided with the container is closed, the upper and lower faces of said container being perforated by the cutting or perforating element or elements located under the lower face and above the upper part of the extraction cavity.

In a variant of the invention the extraction (lower) face of the container is not perforated until a third time when, due to the pressure of the water inside the container said face reaches its breaking stress against the embossed and/or hollowed elements of the container support.

In the course of this step, the shape of the container can voluntarily be modified in relation to its initial shape due to the adaptation to the configuration of the cavity of the extraction device. The shape of the container is thus perfectly defined prior to the extraction, at the time it is positioned, even after having experienced possible deformations subsequent to the previous handlings, particularly when said container contains a product that is not very compacted or is even uncompacted. According to a variant of the method, the positioning operation has a tightening effect which reduces the inner available volume of the container for the purpose of limiting to a defined minimum the areas not filled by the fertiliser to be extracted. This adaptation of the available volume enables favoring the extraction since with the substance uniformly arranged in said cavity, the extraction fluid correctly traverses it.

In a variant of containers containing fertiliser that is compacted at the time of production, the volume of the cavity more accurately corresponds to the dimension of the container for the purpose of preventing the existence of free areas between the container and the container support and preferred inopportune paths during extraction.

In a third time, the water from the main irrigation pipe is introduced in the container under pressure by means of injection means through the perforations made. The faces of the container are applied against the walls of the extraction cavity. In a variant of the method, this pressure inside the container will cause the perforation of the lower face of the container upon reaching its breaking stress due to pulling on it, according to the layout predefined by the container support. The breakages start at the position of the embossed projecting parts or at the hollow parts formed between said embossed parts. According to the shape of the embossment, the breakages can also extend in the two aforementioned areas. The parts that are broken without being detached from the extraction face released from its stress are precisely applied against the embossment for the purpose of widening the openings made, favoring the subsequent draining of the extraction fluid, but such that there is no dispersion out of the container. The internal pressure of the container decreases partially, but this temporary decompression is limited because the flow of fluid coming out of the container is reduced both by the small gaps formed by the lips of the torn material of the extraction face, being supported on the embossment, and by the draining orifices made in or close to the embossed element. The draining is thus perfectly controlled, especially excluding any inopportune movement of the solid phase of the contents of the container which could block the draining orifices, the filters or any of the elements of the irrigation system.

In a fourth time, the fertilising solution has been extracted under a predefined pressure which will be defined by the flow of water introduced through the injector. This flow and therefore the pressure will vary according to the composition of the fertiliser container in the container and of the irrigated surface with each irrigation stage, the fertilising dose thus being correctly adjusted. Complementary openings of the extraction face can, if necessary, be created by the embossed parts of the container support with a decreasing height, preferably provided in their peripheral area when the extraction pressure reaches high values. In any of the cases, water injection flow and therefore the pressure inside the container will always be controlled through a by-pass with a control valve in the main irrigation pipe, if necessary.

In a fifth time, said fertilising solution is reincorporated to the main irrigation pipe to be distributed in the garden or crop through the corresponding devices: drippers, sprinklers, diffusers, microdiffusers, pivot . . . .

According to a first variant of the method, the breakages occur at the lower part of the container when the latter is introduced in the container support and since it consists of embossed elements which are introduced in the container, due to the weight of the latter and the pressure exerted upon closing the container support.

According to a second variant of implementing the method, the breakage of the extraction face of the container can be started at the level of the embossed elements and then extend in the center of the cavities (gaps) formed by said elements when the material reaches its breaking stress at the limit of its deformation.

According to a third variant of the method, the extraction face is opened by obtaining the breaking stress at the position of embossed elements possibly associated to complementary elements, the purpose of which is not to break the extraction face of the container but rather to favor the draining.

The fertilising solution is able to pass between the torn and deformed parts of the extraction face of the container to draining orifices, because these torn parts cannot be applied in a perfectly tight manner against the embossment given a certain relative rigidity due to its rather reduced dimensions.

The number of breakages carried out in the extraction face is preferably several tens. The geometry of the embossed element is generally arranged such that the torn parts are not completely detached but remain integral with the container.

The container used to implement the method of the invention will advantageously be formed by two parts; a thin planar flexible sheet and a polyhedral, frustoconical or cylindrical second part of the same or different material, welded along their periphery such that the weld edge projects from the cavity in which the fertilizer is housed. The material used for the two parts of the container will be permeable to oxygen, light and steam. The container opens after the perforation due to the effect of the pressure increase during the injection of water.

The container according to the invention can vary in size according to the necessary volume of fertiliser for the application.

The general shape of the container is circular, oval or polygonal with 4 to 10 sides with possibly rounded edges or it can be a combination of these three elements.

The sealed container according to the invention is intended to be used as such in the provided extraction device.

The container is ready for its immediate use and does not need any type of preparation prior to positioning it in the extraction system.

After the complete use of the fertiliser contained in the container, which can involve several irrigation stages or even several complete irrigations according to the surface to be organically irrigated, said container can be easily removed from the device without any type of waste and without the user coming into contact with the chemical substances forming the fertiliser at any time of the process.

After its positioning in the machine, the extraction face of the container is not necessarily placed in a horizontal plane. Other orientations may be preferred for the convenience of implementation processes. The invention further relates to the device for implementing the method.

The device for carrying out the method comprises a container support inside which perforation means for perforating the container, water injection means for injecting water inside the container and breaking means for breaking the container are arranged. The container support is advantageously formed by an upper lid and by a lower body between which tightness means are arranged, the two parts cooperating with one another to assure the securing by pressing the edge of the container and forming therebetween a cavity assuring a defined shape of the containing, not necessarily identical to the initial shape thereof. The tightening of the two parts is assured by means for opening and closing the container support, which means make the lid and the body integral with one another.

According to a particular arrangement the extraction cavity, its internal volume can be less than the initial volume of the container. This arrangement is applied particularly to the extraction of uncompacted containers.

According to another particular arrangement of the extraction cavity, the lid and/or the body have elements contributing to moving the fertilising substance to be extracted inside the container in certain privileged areas.

These elements can be in the form of protuberances arranged on the lower face of the lid and/or with a particular geometry of the upper face of the body of the extraction device.

According to a first variant of implementing the water introduction device, the means intended to perforate the upper face of the container and to introduce water inside the container can be in the form of a water distribution grid provided on its lower face with elements such as points, laminae or projections. The water passage orifices do not compulsorily coincide with said elements, but they can advantageously be located in their periphery.

According to a second variant, one or several water injection needles can be provided, which needles are arranged projecting in the cavity of the container support, from the lid. Such needles allow perforating the upper face of the container when it is positioned in the container support, and injecting the fluid inside said container.

The water introduction needle or needles are designed according to a sharp form, such that they perforate the material of the container according to openings which can be at least partially closed again, for the purpose of minimizing the overflow when the container is emptied. They also do not prevent the container from swelling and being applied against the neighboring wall. Finally, the dimension and the arrangement of these water introduction members is chosen such that do not create preferred inopportune paths in the fertilising substance bed, but on the contrary, irrigate it regularly in its entire volume. The shape, dimension and the arrangement of the needle or needles must be adapted to the shape and dimension of the container.

According to an implementation variant, the systems allows the extraction to be performed based on four essential assemblies: the support with the means for opening and closing, the container support, the water inflow pipe to the system, which pipe will be provided with a valve for regulating the flow (if the system is located in a by-pass), and the fertilizing solution outflow pipe to the system. The container support will internally comprise a cavity, means intended to perforate the container and to introduce water therein, and embossed and hollowed elements comprising draining orifices. The system will be positioned forming a by-pass in the main irrigation pipe, if necessary, in front of any bifurcation by electrically-operated valves determining different irrigation stages.

In an implementation variant, the fertilizing solution outflow pipe will consist of a transparent peephole through which the passage of the solution can be observed, such that the user can check when the load of the container has run out, since the fertilizer is provided with a dye for that purpose.

The first of the mentioned assemblies, the support, comprises securing legs provided to anchor the system and the means for opening and closing the container support.

In the container support, the lower part of the body and the part comprising the embossed elements forming the breaking means for breaking the container are not compulsorily integral with one another. The container support will generally consist of two parts, which will comprise the lower part or body (including the embossed and hollowed elements on a part assuring the draining), and the upper part or lid with the means intended to perforate the container and to introduce water. The lower part will be irremovable and fixed to the support with legs, whereas the lid will be actuated by the means for opening and closing the container support.

Particularly referring to the tightness device of the container support, according to a first arrangement, the lower face of the lid has a conical edge. A conical housing of the body opposes it. The two conical elements are introduced one against the other, pressing the edge of the container therebetween. The angles are preferably slightly different for each of these two cones, the theoretical contact area limiting a narrow ring.

In a second arrangement of the tightness device, the lower part of the upper part presses the rim of the container against an elastic O-ring seal located in the periphery of the container support.

In a preferred variant, the tightness is achieved by means of a flexible joint, characterized in that it is located freely in a housing allowing it, under the pressure of the water between the joint and the bottom of the housing, to push said joint and crush it against the rim of the container. In this variant, the water under pressure, vertically pushing the joint, arrives from the bottom of the housing.

According to a second configuration of this variant, the housing receiving the flexible joint only has a radial movement. The water deforming the joint is directly the water contained in the extraction chamber.

In the two configurations described above, the joint can be an O-ring seal, a cylindrical joint or a joint with any other shape known on the market.

According to a particular arrangement of the tightness device, the lid and the body of the container support have complementary elements intended to be fitted, allowing straining the faces of the container at the time of securing the assembly (lower part against upper part with the container positioned between both of them).

In the event that the container has ripples in the peripheral area of its two faces, which ripples are created at the time of its manufacture for the purpose of compensating, without the random occurrence of creases, the three-dimensional assembly of the two planar sheets, the surfaces of the lid and the body demarcating the cavity of the extraction device, as well as its edge, assuring the tightness during the extraction, can have an embossment in the form of ripples compatible with those of the container.

An arrangement similar to the contact area between the lid and the body can advantageously be provided even in the case of the extraction of flexible containers the periphery of which is planar. In this arrangement, however, the ripples have a small width, just enough to strain the edge of the container for the purpose of eliminating accidental creases.

The breaking means assuring the opening of the extraction face of the container can be of different types.

In a first embodiment, the embossed elements are formed by small rectilinear or slightly winding bars or bars in the form of closed or open arches, having different lengths and arranged radially, concentrically, parallel or perpendicular to a perforated grid with a number of small holes. Their section can be semicircular or approximately trapezoidal.

In a second embodiment, the embossed elements can also be in the form of small prisms, truncated pyramids, cylinders or truncated cones with a circular or non-circular polygonal section.

In a third embodiment, the embossed elements form at their base circular or ovoid cavities at the bottom of which the draining orifices of the fertilising solution are located.

According to an implementation variant of the three previous embodiments, the embossed elements form a part arranged in itself on a draining grid.

According to another variant, the embossed elements can form an integral part of a perforated plate of filtration orifices for draining the solution.

In a fourth embodiment, the relative arrangement of the embossed elements and of the draining orifices is reversed. The embossed element is formed by a part comprising hollowed parts with regard to its main surface and draining orifices made at least on the projecting part. The material breaks such that it exposes the projecting parts provided with the orifices.

In a fifth embodiment, the embossed elements are pyramidal parts associated to complementary elements, the function of which is not to break the extraction face of the container but rather to favor the draining of the extracted fluid. The upper face of the pyramids is useful as a support surface when the container is subjected to the effect of the pressure. The breakage starts on the edges of said pyramids. In a second variant, the pyramidal shapes are formed by entire and/or partial, i.e. asymmetrical, pyramids. Asymmetrical pyramids can be obtained either with pyramids all the vertical faces of which do not have the same angle or with originally symmetrical pyramids from which several vertical portions have been eliminated. For this fifth embodiment, the faces of the embossed elements and possibly of the steps and of the channels can have small grooves favoring the draining of the solution, the material of the extraction face having a sufficient rigidity which does not allow it to completely adapt to the shape of the groove. Several types of pyramids can co-exist in this fifth embodiment.

In a sixth preferred embodiment, the height of the pyramids and of the adjacent channels is not constant on the entire surface. A part of such surface is intended to cause the opening of the container only when a pressure higher than the usual value is reached, thus correcting the extraction flow rate, increasing it. This effect is preferably obtained by decreasing the height of the pyramids and increasing the depth of the channels separating the steps. Its objective is to regulate the flow rate from one container to another which, without this, could vary according to the type of fertiliser contained.

In a variant of the aforementioned forms, the extraction can be limited to a preferably ring-shaped area of the lower face, for the purpose of forcing the water to cover a maximum path in the fertiliser bed when the water is centrally introduced. Reciprocally, the reverse configuration is possible.

In all the cases described above, the openings of the lower wall of the container are the result of its deformation to breakage, but only under the effect and after applying the pressure to the container by the irrigation water.

In the event that the container support forms part of a system referred to as a clamp system, the container is directly inserted in the machine and the perforation of the upper part of the container by the cutting or perforating elements is carried out when the clamp is closed. In this case, the upper part or the lower part can either have a rotational movement according to a horizontal or vertical axis, a bending movement or a drawer-like movement allowing this insertion. The two parts are integral during the extraction by a hook system or any other suitable device. The advantage of this solution is that at the time of the securing or loosening, there is no rotational movement of the container, which prevents the use of showers or rotating pyramids. Another advantage is that the tightening force before the extraction can be higher thanks to a multiplying mechanism.

The arrangement of the respective parts can be modified with regard to the arrangement described above; the extraction face, for example, can be arranged according to a vertical or oblique plane. The water injection can then be perpendicular or non-perpendicular to it.

To complete the previous description and with the aim of aiding to better understand the features of the invention, a detailed description of a preferred embodiment will be made based on a set of drawings attached to this specification, in which the following has been shown with a merely orientating and non-limiting character:

DESCRIPTION OF THE PREFERRED EMBODIMENTS

Figure 1:
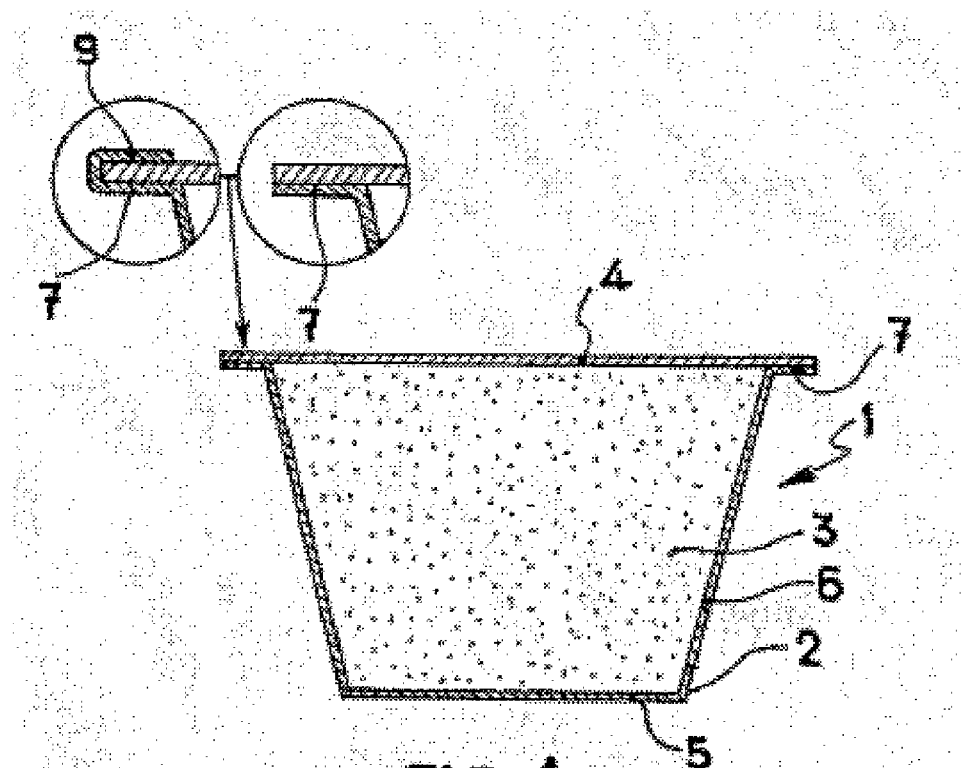
FIG. 1 shows a schematic representation of the container according to the invention.

As can be seen in FIG. 1, the container (1) of the invention comprises a receptacle (2) formed by a bottom (5) and a frustoconical side wall (6) extending towards the outside in a planar rim (7). The container contains soluble fertiliser (3), and is closed by a cover (4) welded on the rim (7). In one variant, the rim (7) defines a circumference that is greater than the edge of the cover (4), therefore it can be folded over itself in a fold (9), thus improving the rigidity and the sealing of the container (1) due to the setting of the rim (7) on the periphery of the cover (4).

Figure 2:
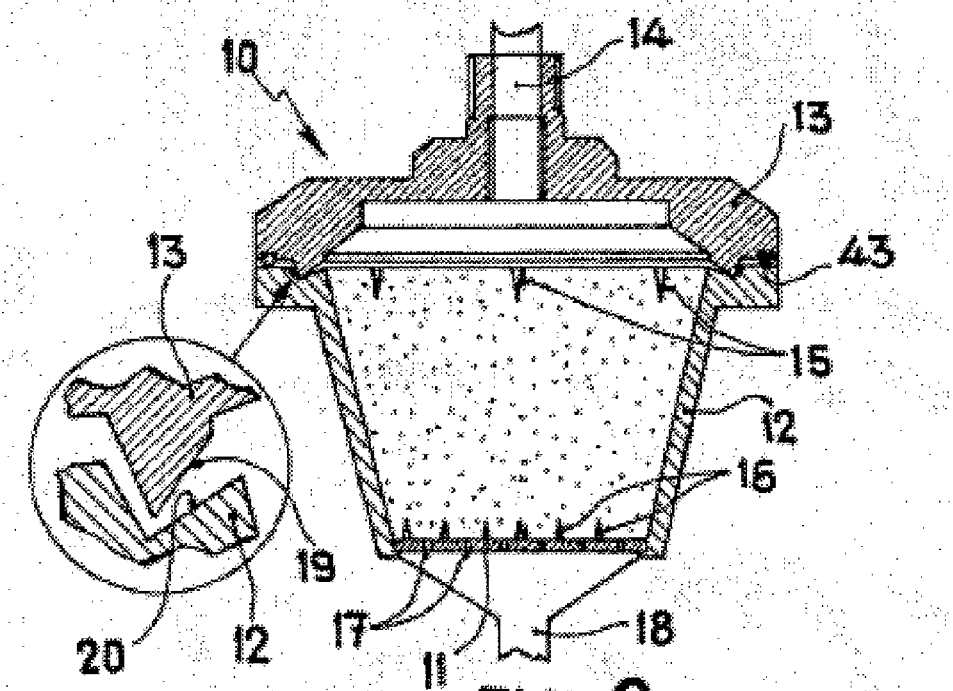
FIG. 2 shows a schematic representation of the extraction device according to the invention.

The device of the invention basically comprises a container support (10) intended to receive therein the container (1), as shown in FIG. 2. The container support (10) comprises a body (12) closed at the upper part by a lid (13) joined to a water inlet (14) and provided with points (15) to perforate the upper face of the container (1), and a body (12) ending at the lower part in a base (11) having a plurality of projecting elements (16) and draining orifices (17) communicated with an outflow pipe (18).

Figure 3:
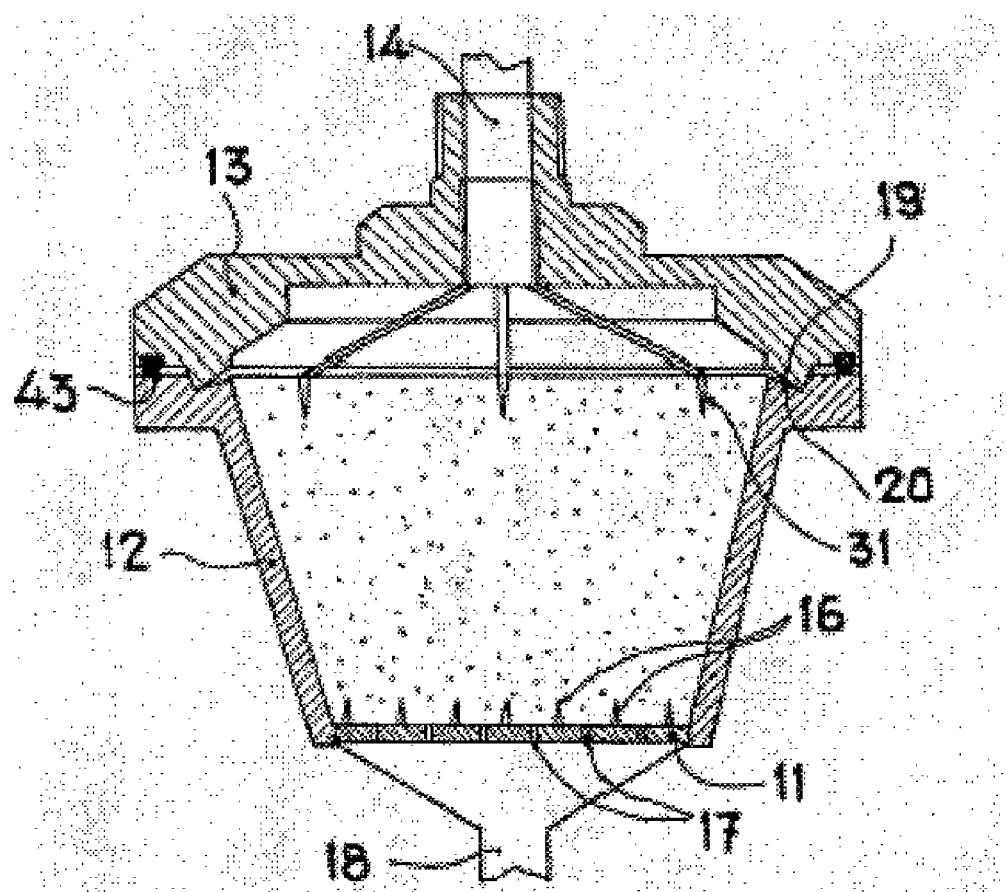
FIG. 3 shows a partial schematic representation of the extraction device, according to a second embodiment.

FIG. 3 relates to a second embodiment of the extraction device, in which the points (15) have been substituted with injection needles (31). At the time of closing the container support, the hollow injection needles (31) perforate the cover (4) of the container (1), subsequently allowing the introduction of the extraction fluid therethrough.

The lid (13) has at its lower face a conical edge (19) in correspondence with a conical housing (20) having in its upper face the body (12) of the container support (10). These elements, fitted in one another after the closure of the container support (10), contribute to securing the container (1), straining its faces and centering the powder fertilising substance again. An O-ring seal (43) assures the tightness of the container support (10).

Figure 4:
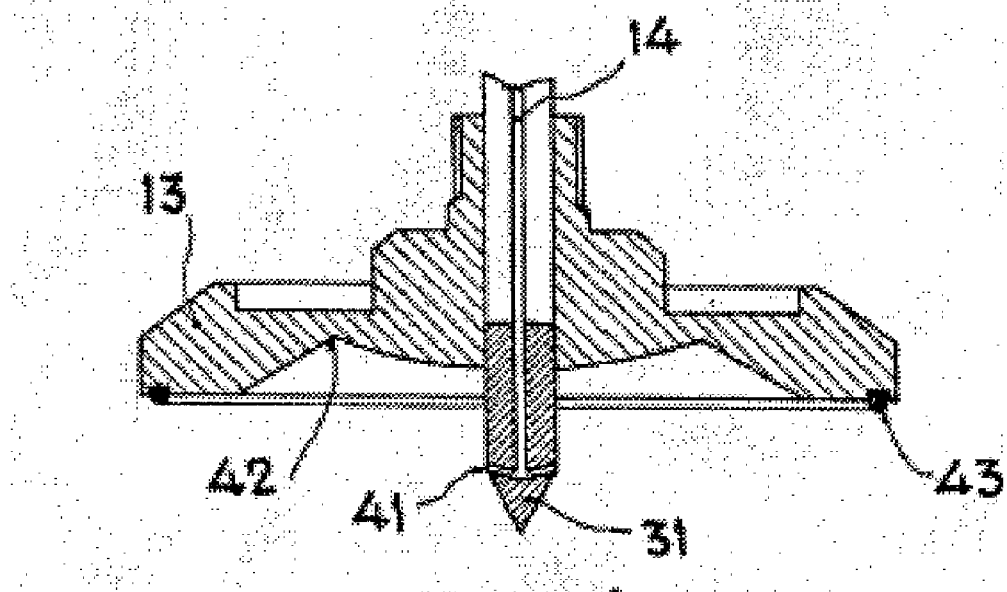
FIG. 4 shows a schematic detail of the water injection means, according to a second embodiment.

FIG. 4 shows another embodiment of the water injection means comprising a single injection needle (31) for perforating the container (1). This injection needle (31) has several injection orifices (41) to introduce water in the container (1). The lid (13) comprises a concave area (42) allowing better water distribution, such that the upper face of the container (1) is applied against said concave area (42).

Figure 5:
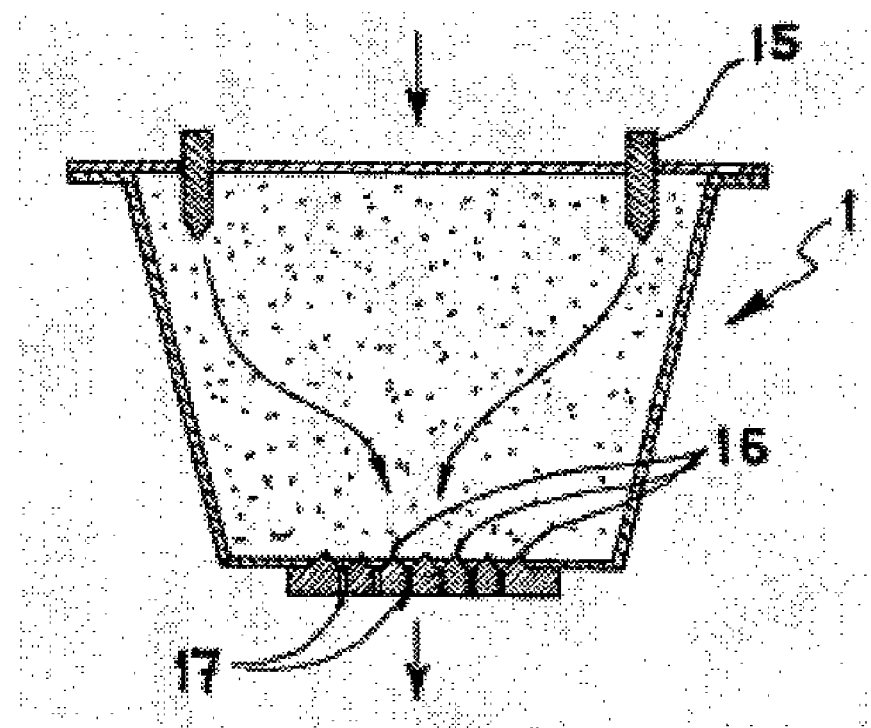
FIG. 5 shows a schematic representation of the positioning of the water inlet members and of the breaking means provided for draining the fertilising solution, according to a first embodiment.
Figure 6:
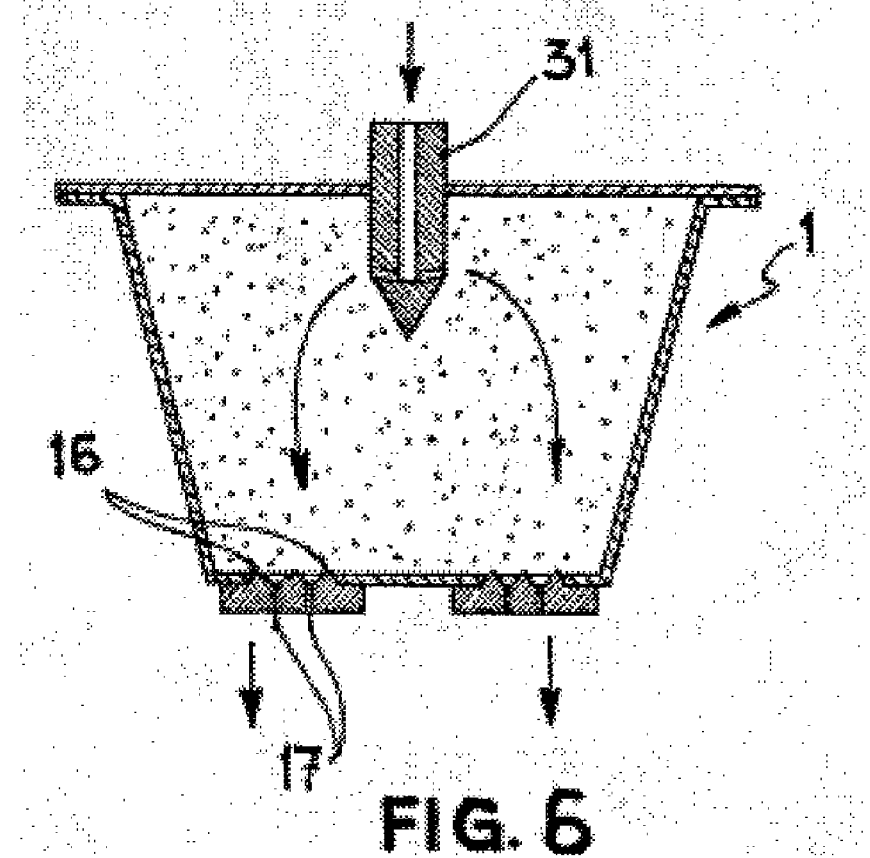
FIG. 6 shows a schematic representation of the positioning of the water inlet members and of the breaking means provided for draining the fertilising solution, according to a second embodiment.

FIG. 5 shows a perimetric arrangement of the perforation means for perforating the container, and a central arrangement of the breaking means for breaking the container, as well as the resulting water path, whereas FIG. 6 shows a central arrangement of the perforation means for perforating the container, and a perimetric arrangement of the breaking means for breaking the container, as well as the resulting water path. In both cases, the entrainment of the fertiliser is facilitated by the stream of water.

Figure 7:
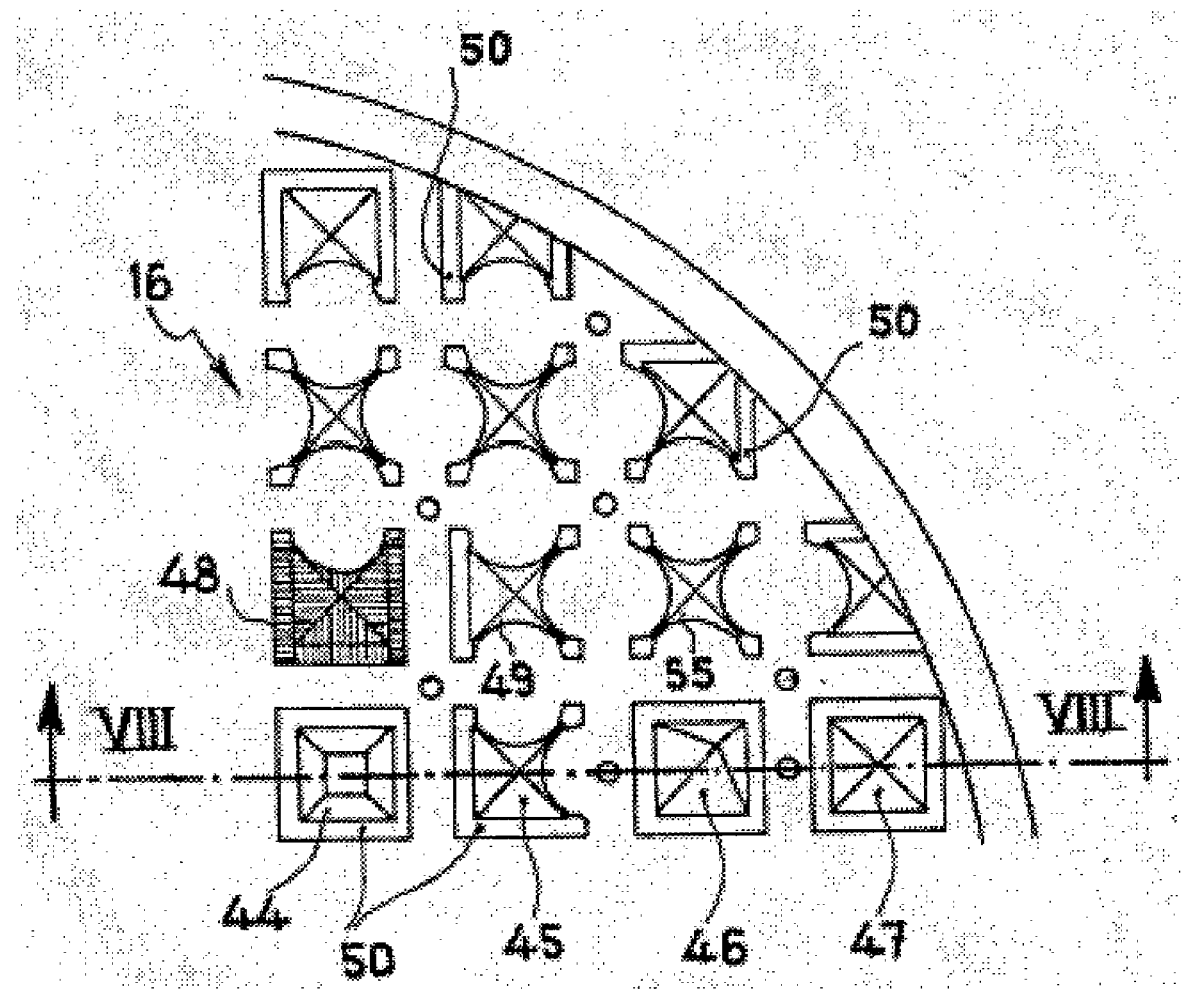
FIG. 7 shows a partial plan view of the breaking means and of the draining orifices.
Figure 8:
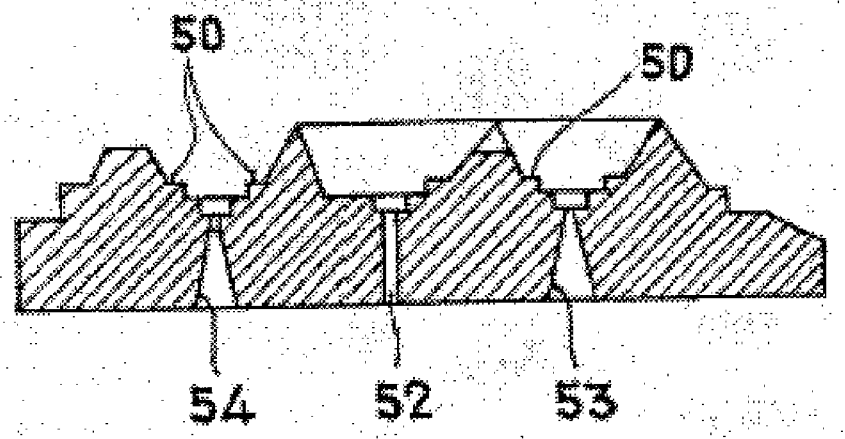
FIG. 8 shows a section according to line VIII-VIII of FIG. 7.

FIG. 7 shows several types of embossed pyramidal elements forming the breaking means. These elements can be truncated pyramids (44), pyramids (45) truncated on two faces, asymmetrical pyramids (46), symmetrical pyramids (47), rippled pyramids (48), pyramids (49) truncated on three faces (49), and pyramids (55) truncated on four faces. The presence of steps (50) allows controlling the breakage of the lower face of the container. The draining orifices (17) can have three different shapes; cylindrical (52), downwardly widened (53) or cylindrical and downwardly widened (54).

Figure 9:
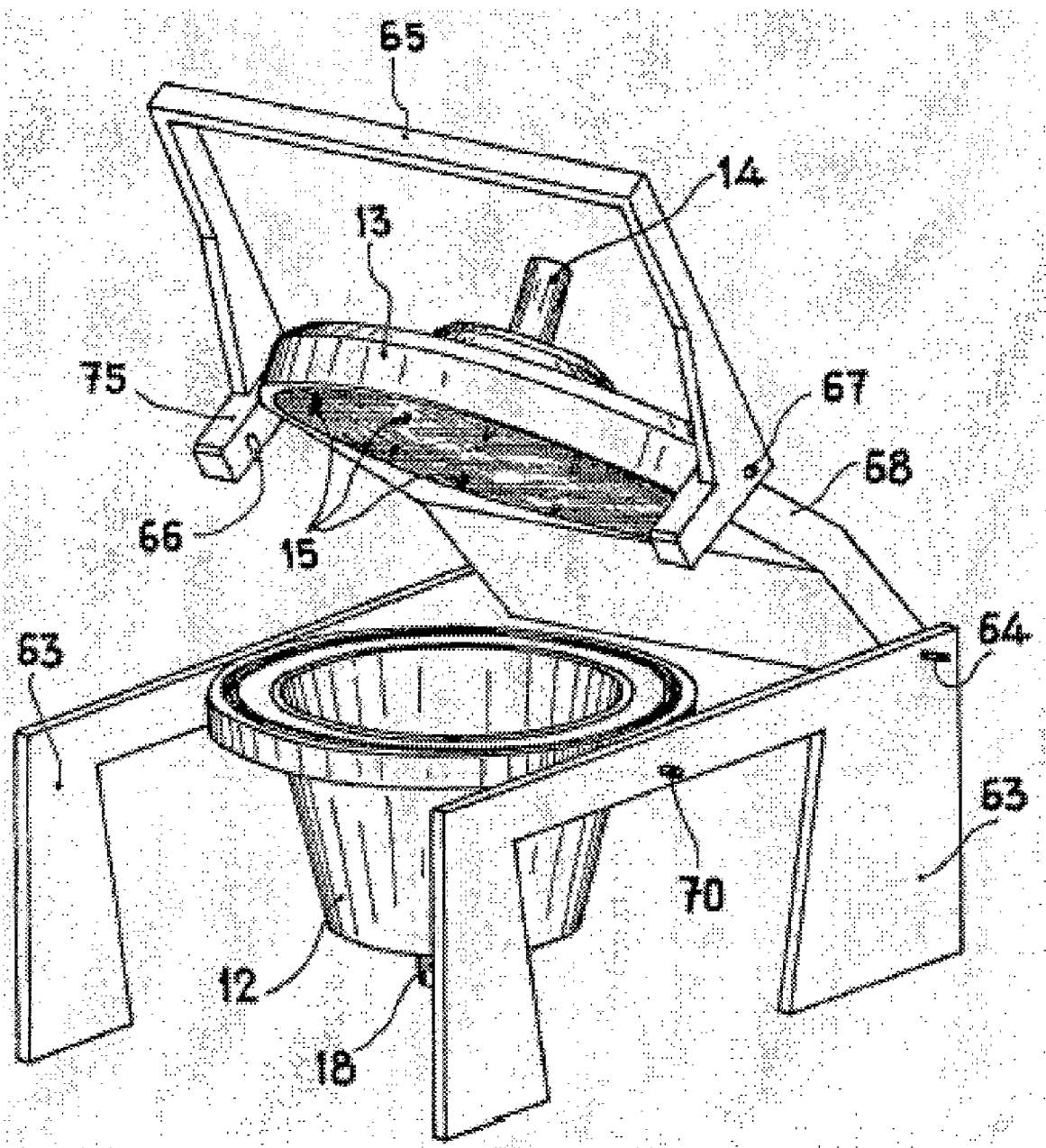
FIG. 9 shows a perspective representation of the assembly of the device of the invention, the means for opening and closing the container support being observed.

FIG. 9 shows the means for opening and closing the container support (10), which means comprises an arm (68) hinged on a first rod (64) integral with a double support (63) joined to the body (12) of the container support (10), there being arranged on the arm (68) a second rod (67) which is integral with the lid (13) and on which a locking yoke (65) provided with two uprights (75) is hinged, which uprights have hook-shaped notches (66) provided to receive therein the corresponding lugs (70) integral with the double support (63).

The following operation is used; the container (1) is positioned in the body (12) of the container support (10), the arm (68) is lowered, resting on the locking lever (65) until positioning the hooks (66) on the lugs (70) of the double support (63), whereby the conical edge (19) of the lid (13) cooperates with the conical housing (20) of the body (12), securing the rim (7) of the container (1) while at the same time as the injection needles (31) perforate it. A subsequent rotation of the locking lever (65) compresses the O-ring seal (43) to assure tightness, the device being ready to connect the water. The water penetrates the container (1) through the water inlet (14). The pressure in the container (1) increases and the lower face of the container (1) is applied against the projecting elements (16) until reaching its breaking stress. The extraction stage begins. The fertilising solution comes out through the draining orifices (17) and is recovered through the outflow pipe (18), passing to the main irrigation pipe (not shown). Once the extraction of the fertilizer has ended, the locking lever (65) is released to raise the arm (68) and allow the substitution of the used container (1). See FIGS. 1, 3 and 9.

The invention claimed is:

1. A method of extracting contents from sealed flexible containers using irrigation water, comprising the following steps:
   a) perforation of the container with the closure of a container support,
   b) injection of irrigation water through the perforations made in the previous step,
   c) breakage of the container, by applying the container against breaking means arranged on the container support, such that the container is internally subjected to the pressure of the irrigation water,
   d) extraction of the content of the container by means of the stream of irrigation water.

2. A method according to claim 1, wherein the perforation of the container is produced in the upper part thereof, and the breakage of the container is produced in its lower part.

3. A method according to claim 2, wherein the breakage of the container is initially produced in the point of contact thereof against projecting elements of the breakage means, the subsequent breakage being transmitted to the cavities present between the projecting elements.

4. A method according to claim 1, wherein the parts of the container torn therefrom during the breakage remain attached to the container.

5. A device for extracting contents from sealed flexible containers using irrigation water, comprising
   a container support (10),
   perforation means for perforating the container (1) arranged in the container support (10),
   injection means for injecting the irrigation water inside the container (1) arranged in the container support (10),
   breaking means for breaking the container (1) arranged in the container support (10),
   a water inlet (14) connected to the water injection means,
   a plurality of water draining orifices (17) arranged next to the breaking means for breaking the container and connected to an outflow pipe (18),
   means for opening and closing the container support (10).

6. A device according to claim 5, wherein the container support (10) comprises a body (12) and a lid (13) that can be opened to introduce therein a container (1), and closed to form a sealed cavity as a result of the presence of tightness means.

7. A device according to claim 6, wherein the tightness means comprise an O-ring seal (43) located in the periphery of the container support (10).

8. A device according to claim 5, wherein the container support (10) comprises means for securing the container (1) when the container support (10) is in the closed position.

9. A device according to claim 8, wherein the means for securing the container (1) comprise a conical edge (19) in the lower part of the lid (13) of the container support (10), and a conical housing (20) in the upper part of the body (12) of the container support (10), which can cooperate with one another to trap a rim (7) of the container (1).

10. A device according to claim 5, wherein the perforation means for perforating the container comprise a plurality of points (15) joined to the lid (13) of the container support.

11. A device according to claim 10, wherein the water injection means comprise conduits located inside at least one injection needle (31), being finished at that end with injection orifices (41) close to the point of the injection needle (31) and the opposite end being connected to the water inlet (14).

12. A device according to claim 5, wherein the breaking means for breaking the container comprise a plurality of projecting elements (16) arranged between draining orifices (17).

13. A device according to claim 12, wherein the projecting elements (16) comprise at least one of the shapes of the group formed by symmetrical pyramids (47), asymmetrical pyramids (46), rippled pyramids (48) and truncated pyramids (45)(49)(55).

14. A device according to claim 5, wherein the means for opening and closing the container support (10) comprise an arm (68) hinged on a first rod (64) integral with a double support (63) joined to the body (12) of the container support (10), there being arranged on the arm (68) a second rod (67), integral with the lid (13), on which there is hinged a locking yoke (65) provided with two uprights (75) having hook-shaped notches (66) provided to receive therein corresponding lugs (70) integral with the double support (63).

15. A flexible sealed container (1) containing a soluble fertiliser (3) therein, provided for being used in the device of claim 5, wherein is comprises a receptacle (2) formed by a bottom (5) and a frustoconical side wall (6) extending towards the outside in a rim (7), and a cover (4) welded on the periphery of the rim (7).

* * * * *